United States Patent [19]

Wreede et al.

[11] 4,330,604

[45] May 18, 1982

[54] FABRICATION OF HOLOGRAMS ON PLASTIC SUBSTRATES

[75] Inventors: John E. Wreede, Monrovia; Andrejs Graube, Marina Del Rey; Mark A. Mulvihill, Redondo Beach, all of Calif.

[73] Assignee: Hughes Aircraft Company, Culver City, Calif.

[21] Appl. No.: 174,950

[22] Filed: Aug. 4, 1980

[51] Int. Cl.[3] ............................................. G03C 1/84
[52] U.S. Cl. ........................................ 430/2; 350/3.6;
350/3.61; 430/12; 430/14; 430/17; 430/18;
430/168; 430/289; 430/496; 430/523; 430/531;
430/532; 430/533; 430/564; 430/945; 430/954;
430/961
[58] Field of Search ..................... 430/1, 2, 168, 523,
430/524, 525, 954, 961, 945, 533, 538, 531, 532,
539, 363, 12, 13, 14, 17, 18, 432, 463, 289, 564,
496; 350/67, 3.6, 3.61

[56] References Cited

U.S. PATENT DOCUMENTS

| | | | |
|---|---|---|---|
| 3,637,416 | 1/1972 | Misch et al. | 128/412 |
| 3,642,472 | 2/1972 | Mayo | 430/1 |
| 3,645,779 | 2/1972 | Kienel | 427/42 |
| 3,711,284 | 1/1973 | Van Paesschen et al. | 430/950 |
| 3,811,753 | 5/1974 | Onoki et al. | 57/409 |
| 3,864,132 | 2/1975 | Rasch et al. | 430/524 |
| 3,928,108 | 12/1975 | Adicoff et al. | 15/246 |
| 3,984,581 | 10/1976 | Dobler et al. | 427/35 |
| 4,025,345 | 5/1977 | Kido et al. | 430/461 |
| 4,032,338 | 6/1977 | Gange | 433/437 |
| 4,076,772 | 2/1978 | Murbach | 427/163 |

FOREIGN PATENT DOCUMENTS 1297115 11/1972 United Kingdom ................ 430/950

OTHER PUBLICATIONS

"Photographic Emulsion Chemistry", G. F. Duffin, The Focal Press, London, (1966), pp. 51–54.
Holographic Optical Element For Visual Display Applications, D. G. McCauley, C. E. Simpson, W. J. Murbach., pp. 232-242.

*Primary Examiner*—Mary F. Downey
*Attorney, Agent, or Firm*—David W. Collins; W. H. MacAllister

[57] ABSTRACT

An improved process is provided for attaching layers of hydrophilic, photosensitive materials onto hydrophobic plastic substrates, which comprises forming a layer of a polycrystalline, optically transparent, moisture barrier material on the substrate, followed by depositing thereon a layer of a hydrophilic, polar material, prior to depositing the photosensitive layer thereon. The process is especially suitable for the fabrication of pre-holographic elements and holograms. Holograms are fabricated by exposing and developing latent images in the photosensitive layer of pre-holographic elements and attaching to the photosensitive layer by an optical adhesive a protective cover layer comprising a plastic substrate coated with the moisture barrier material and the hydrophilic material. Additional moisture barrier protection may optionally be provided by forming a combination of moisture barrier layers and hydrophilic layers on the outer surfaces of the plastic substrates.

37 Claims, 3 Drawing Figures

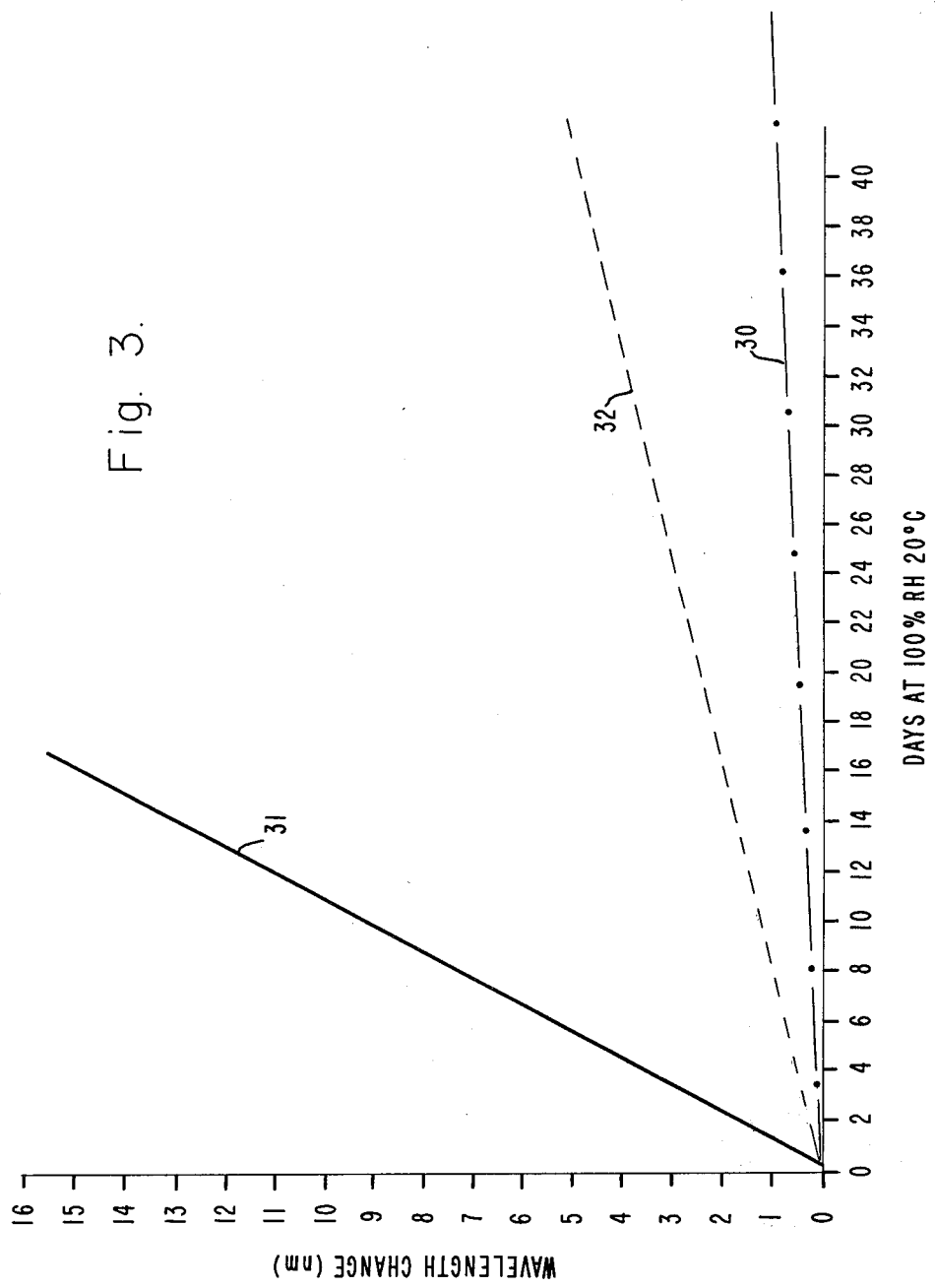

FABRICATION OF HOLOGRAMS ON PLASTIC SUBSTRATES

CROSS-REFERENCE TO RELATED APPLICATIONS

This application is related to Ser. No. 137,343, filed Apr. 4, 1980, which discloses fabrication of holograms comprising photosensitive layers on plastic substrates, employing as a subbing layer between the substrate and photosensitive layer a glassy, moisture barrier layer.

BACKGROUND OF THE INVENTION

1. Field of the Invention

The invention relates to a process for attaching layers of hydrophilic, photosensitive materials onto hydrophobic plastic substrates, and, in particular, to a process for forming pre-holographic elements and holograms comprising hydrophilic photosensitive materials on hydrophobic plastic substrates.

2. Description of the Prior Art

It has been widely recognized in the photographic art that a light-sensitive photographic emulsion, or photosensitive material, applied directly to the surface of a plastic support or substrate does not exhibit sufficient adhesion to the support film for use in most of the usual photographic end uses. As a result, it has become common practice to interpose one or more "subbing" layers between the support film and the photographic emulsion or photosensitive material. These problems also obtain for holographic applications, since photosensitive materials applied to plastic substrates are also employed.

There are many problems attending the use of chemical subbing layers on photographic and holographic plastic substrates. In addition to the obvious drawbacks of having to deposit one or more subbing layers, these subbing layers:

(1) are specific to plastics of different chemical composition;

(2) do not prevent the diffusion of water vapor into the photosensitive layer and therefore do not improve hologram stability; and (3) can be grainy and non-uniform in thickness, which graininess causes light scattering noise during exposure and which non-uniformity causes phase errors in transmitted light.

Chemical subbing techniques for photographic plastic substrates are the subject of a review in a book by G. F. Duffin, *Photographic Emulsion Chemistry*, Focal Press Limited, London, 1966. A technique for chemically subbing poly-(methyl methacrylate) for use as a dichromated gelatin holographic substrate is the subject of an article by D. G. McCauley et al, in Vol. 12, Applied Optics, pp. 232–242 (1973).

While the subbing layers of the prior art are generally suitable for regular photographic substrates, the graininess and non-uniformity limits their usefulness for fabricating holographic substrates.

SUMMARY OF THE INVENTION

In accordance with the invention, processes for fabricating pre-holographic elements supported on hydrophobic substrates and holograms are provided. A pre-holographic element supported on a hydrophobic substrate is fabricated by a process which comprises:

(a) forming a layer of a polycrystalline, optically transparent, moisture barrier material on at least a portion of the hydrophobic substrate by a process which generates a temperature at the substrate less than that of its softening point at which it deforms;

(b) forming a layer of a hydrophilic, polar material on at least a portion of the moisture barrier layer by a process which generates a temperature at the substrate less than that of its softening point; and (c) forming a layer of a hydrophilic, photosensitive material on at least a portion of the layer of hydrophilic material.

A hologram is fabricated by a process which comprises:

(a) exposing the photosensitive layer of the pre-holographic element to an actinic interference pattern to record a latent image thereon;

(b) developing the photosensitive layer to obtain the recorded latent image; and (c) forming a protective layer on the photosensitive layer.

The manner in which the polycrystalline moisture barrier layer is formed on the substrate gives the moisture barrier layer good adherence to the hydrophobic plastic, while the polar properties of the hydrophilic layer make it readily adhere to the hydrophilic photosensitive layer. The double layer subbing technique of the invention for plastic substrates is applicable to plastic substrates of different composition, yields good photosensitive film adhesion while eliminating light scattering noise and phase errors and reduces water vapor diffusion into the photosensitive layer, thereby improving hologram lifetime.

BRIEF DESCRIPTION OF THE DRAWING

FIG. 3, on coordinates of wavelength drift and time, depicts the moisture resistant behavior of the moisture barrier layer of the invention.

DETAILED DESCRIPTION OF THE INVENTION

Holograms are finding a variety of uses, including helmet-mounted displays such as disclosed in U.S. Pat. No. 3,928,108 and eye protection reflectors for laser radiation, where plastic substrates and resistance to wavelength changes from water absorption are necessary. In fabricating a hologram, a pre-holographic element comprising a photosensitive layer on a substrate is processed to expose the photosensitive layer to an actinic interference pattern to record a latent image thereon. The photosensitive layer is then developed to obtain the recorded latent image and the photosensitive layer is covered with a protective layer. By actinic radiation is meant that radiation which has an effect on the photosensitive layer.

The pre-holographic element is fabricated by a process which comprises:

(a) forming a layer of a polycrystalline, optically transparent, moisture barrier material on at least a portion of a hydrophobic substrate by a process which generates a temperature at the substrate less than that of its softening point at which it deforms;

(b) forming a layer of a hydrophilic, polar material on at least a portion of the moisture barrier layer by a process which generates a temperature at the substrate less than that of its softening point; and (c) forming a layer of a hydrophilic, photosensitive material on at least a portion of the hydrophilic, polar layer. Alternatively, a co-deposited polycrystalline layer functioning as both a moisture barrier and a hydrophilic layer may be employed.

As used herein, hydrophilic photosensitive layers include photographic and holographic emulsions which utilize hydrophilic organic colloids as an emulsion vehicle. Hydrophobic plastic substrates include materials such as cellulose-acetate, polystyrene, polyester, poly-(methyl methacrylate) and polycarbonate.

Figure 1:
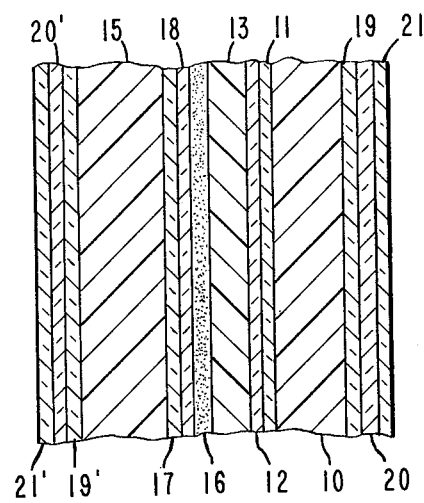
FIG. 1, in cross-section, depicts a hologram in accordance with the invention.
Figure 2:
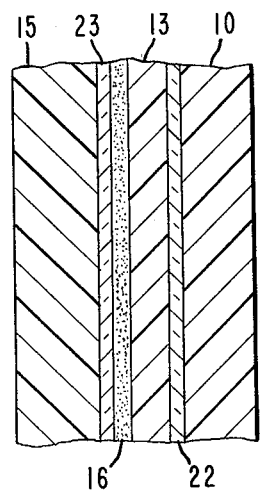
FIG. 2, in cross-section, depicts an alternative embodiment of the invention.

As shown in FIG. 1 (not to scale), hydrophobic substrate 10 supports moisture barrier layer 11, which supports hydrophilic layer 12 which in turn supports photosensitive material 13. The coated substrate may be of any shape, such as planar, as shown in FIGS. 1 and 2, spherical, cylindrical, aspherical and combinations thereof.

The hydrophobic substrate may comprise any of the optically transparent plastic materials suitable in the art and include materials such as celluoseacetate, polystyrene, polyester, poly-(methyl methacrylate) and polycarbonate and copolymers containing these polymers. The polymer of allyl diglycol carbonate (available from PPG Industries, Inc., Pittsburgh, Pa. under the trade designation CR-39) appears particularly well-suited in the practice of the invention.

The thickness of the substrate is not critical, other than that it be thick enough to provide adequate support, that is, be mechanically rigid or stable to support the photosensitive layer, and thin enough to be substantially optically transmissive, as described below. Typical thicknesses range from about 1/16 to ½ inch.

By optically transparent, as used herein, is meant that the material is substantially transparent at least over the visible and near-infrared regions. For all optically transparent layers combined, the radiation transmitted to the photosensitive layer should be at least about 95% of the radiation incident on the surface of the outermost layer, neglecting surface reflections.

The moisture barrier layer 11 comprises a polycrystalline, optically transparent material. The hydrophilic layer 12 comprises an optically transparent, polar material and may be either glassy or polycrystalline. Since the polar character of the photosensitive layer 13 varies from one material to another, the polarity and thickness of the layer immediately adjacent the photosensitive layer should be adequate so as to provide sufficient adhesion of the photosensitive layer thereto. In any event, simple experimentation is sufficient in selecting suitable materials.

The moisture barrier layer provides a barrier against diffusion of water vapor such that over the lifetime of the device (typically about 3 to 5 years), no more than about $2 \times 10^{-6}$ g $H_2O/cm^2$ is transmitted. Examples of such materials include silicon nitride ($Si_3N_4$) and silicon oxynitride. Examples of the hydrophilic material include silica ($SiO_2$), soft glasses and silicon oxynitride.

The thickness of the moisture barrier layer is not per se critical, other than that it be thick enough to provide the moisture barrier protection noted above and no so thick as to result in cracking due to thermal stresses resulting from different thermal coefficient of expansion of materials. The thickness of the hydrophilic, polar layer is also not per se critical, other than it be thick enough to provide the requisite adhesion of the photosensitive layer and not so thick as to be subject to undue thermal stresses. A layer of $Si_3N_4$ of about 0.1 to 1 $\mu m$ is suitable for use as a moisture barrier layer 11 in conjunction with a hydrophilic layer 12 of glassy $SiO_2$ of about 0.1 to 0.5 $\mu m$. Alternately, as shown in FIG. 2, a mixed layer 22 of silicon oxynitride (co-deposited $SiO_2$ and $Si_3N_4$) will provide a sufficient moisture barrier with suitable hydrophilic character for adherence of the photosensitive layer 13. Thicknesses in the aforementioned ranges provide adequate moisture barrier protection consistent with minimal effects resulting from thermal stresses.

The moisture barrier layer 11 is formed on at least a portion of the hydrophobic substrate 10 by a process which generates a temperature at the substrate less than that of its softening point at which it deforms. Examples of such processes include electron beam evaporation and plasma-enhanced deposition. These well-known processes can be performed without pre-heating the substrate, and result in surface temperatures under 100° C. Clearly, processes resulting in melting of the substrate would be unsuitable. However, processes which may result in temperatures sufficient to heat the substrate to its softening point, including the e-beam evaporation and plasma-enhanced deposition processes mentioned above, may be used so long as the plastic substrate is not deformed during the deposition of the moisture barrier material. Specific process parameters are readily determined by experimentation.

The hydrophilic, polar layer 12 is formed on at least a portion of the moisture barrier layer, employing any of the foregoing processes, again avoiding melting of the substrate. Advantageously, the same process is employed for depositing both layers.

A layer 13 of a hydrophilic, photosensitive material is formed on at least a portion of the hydrophilic, polar layer 12 of FIG. 1 or the mixed layer 22 of FIG. 2 by processes well-known in the art and thus such processes do not form a part of this invention; see, e.g., Vol. 12, Applied Optics, pp. 232–242 (1973) and Vol. 8, Applied Optics, pp. 2346–2348 (1969).

The hydrophilic, photosensitive layer may comprise emulsions which utilize hydrophilic organic colloids as an emulsion vehicle such as dichromated gelatin, photographic silver halide emulsion, diazo gelatin and other gelatin-based photosensitive materials. The thickness of the photosensitive layer ranges from about 1 to 100 $\mu m$, as is well-known. Generally, the thicker the layer, the more efficient in diffracting light. On the other hand, the thinner the layer, the larger the viewable angle and the larger the spectral bandwidth. Photosensitive layers for conventional holograms typically range from about 6 to 20 $\mu m$, as is well-known.

To fabricate a hologram, the pre-holographic element is further processed by exposing the photosensitive layer, either directly or through the substrate 10, to an actinic interference pattern to record a latent image thereon. The interference pattern may be generated by a picture, one or more lenses, or other suitable sources employing techniques known in the art. The photosensitive layer is then developed by methods known in the art to obtain the recorded latent image. In the case of a photosensitive layer comprising dichromated gelatin, washing with water and dehydrating with alcohol is used to develop the photosensitive layer (i.e., amplify the latent image).

A protective plastic cover 15, such as one of the plastic substrate materials mentioned above, is sealed onto at least a portion of the developed photosensitive layer, employing adhesive 16. The protective plastic cover includes a layer of moisture barrier material 17 and a layer of hydrophilic, polar material 18, again, in order to protect the photosensitive layer against degradation effects due to the penetration of water vapor. The moisture barrier material and hydrophilic material may be any of the moisture barrier materials and hydrophilic materials, respectively, described above. Since the thickness of the moisture barrier layer determines the rate of water vapor diffusion, advantageously, both moisture barrier layers are of substantially the same thickness.

The thickness of the adhesive layer 16 is relatively unimportant, and as this is an optical cement, is determined by the particular application, just as for sealing lenses. Requirements, in addition to the usual requirements for optical cements, include non-reactivity with the photosensitive layer and low water content, both before and after hardening. Suitable materials include two-part epoxies and UV curing adhesives.

As shown in FIG. 2, the moisture barrier layer and hydrophilic layer can be combined in a single layer 22 by co-depositing the two layers at the same time. An example of the co-deposition is the deposition of $Si_3N_4$ and $SiO_2$ at the same time rather than sequentially. The same process may be used to coat the protective cover 15 with co-deposited layer 23 prior to attaching the plastic cover 15 to the photosensitive layer 13 with adhesive 16.

In yet another embodiment (not shown), the first two embodiments may be combined by depositing a layer of $Si_3N_4$ on the plastic substrate, followed by a blend of graded layer of $Si_3N_4$ and $SiO_2$ whose concentration ratios are depth-dependent and a layer of $SiO_2$, to which the photosensitive layer 13 (or adhesive 16) is attached. The blend is conveniently fabricated by injecting water and ammonia in varying amounts to react with silane in the reactor/depositor of plasma-enhanced deposition. The deposition may or may not have a pure $SiO_2$ layer at the plastic substrate. The advantage with this embodiment is the lack of a definitive interface, while retaining the moisture barrier properties of $Si_3N_4$ and the hydrophilic, polar properties of $SiO_2$. The effective refractive index of the thin blend layer is the average of the two materials, and is thus continuously variable. The high refractive index of $Si_3N_4$ does not cause severe surface reflection problems in this embodiment. Other embodiments involving various combinations of the moisture barrier layer, such as $Si_3N_4$, and the hydrophilic, polar layer, such as $SiO_2$, are also contemplated as being within the scope of the invention.

Although not shown, it is preferred that the edges of the photosensitive layer 13 also be protected. Although this layer is already thin enough so that diffusion by water vapor generates minimal adverse effects, contemplated long term usage dictates such additional protection, especially in applications such as helmet-mounted displays where even such minimal adverse effects are detrimental to usage. This edge protection may be a metal frame or an application of a suitable low moisture permeability polymeric edge sealant.

Optionally, additional protection may be provided by forming successive protective layers 19, 19' comprised of the hydrophilic, polar materials described above, 20, 20' comprised of the polycrystalline, moisture barrier materials described above and 21, 21' comprised of the hydrophilic, polar materials described above. Advantageously, layers 19, 19', 21 and 21' consist essentially of glassy $SiO_2$, while layers 20 and 20' consist essentially of $Si_3N_4$. These layers may instead be formed as one layer by co-depositing $SiO_2$ and $Si_3N_4$, as described above. Alternatively, conventional anti-reflection coatings, suitable for plastic substrates, may be employed.

EXAMPLES

Moisture transmission rate through the protective barrier was determined by measuring the peak reflection wavelength of a Lipmann grating recorded in the photosensitive dichromated gelatin layer. As water diffuses through the substrate and protective cover, it is absorbed by the dichromated gelatin film, causing it to change thickness. The thickness change varies the separation between the Bragg planes in the Lipmann grating, causing a shift in the peak reflective wavelength that the grating diffracts. The water trnsmission rate can then be quantitatively determined from reflective wavelength shift measurements.

The Table below lists the wavelength change (in nm) in dichromated gelatin holograms due to absorption of water. Three substrates are employed: a glass substrate (⅛ inch), a CR-39 substrate (1/16 inch) and a CR-39 substrate (1/16 inch) coated with about 0.2 μm $Si_3N_4$. The wavelength changes were measured as a function of time (in days) for holograms exposed to 100% relative humidity.

| | WAVELENGTH CHANGE IN DICHROMATED GELATIN HOLOGRAMS DUE TO ABSORPTION OF WATER | | |
|---|---|---|---|
| | Wavelength Change (in nanometers) | | |
| Days at 100% RH | Glass Substrate | CR-39 Substrate | CR-39 with ~0.2 μm $Si_3N_4$ coating |
| 0 | 0 | 0 | 0 |
| 1 | −0.6 | 0 | −0.1 |
| 2 | 0 | 1.9 | 1.3 |
| 3 | 0.5 | 4.0 | 1.3 |
| 6 | −0.3 | 1.8 | 0.5 |
| 7 | −0.8 | 0.3 | 1.4 |
| 8 | −0.4 | 4.3 | 1.7 |
| 10 | 0.1 | 8.0 | 2.2 |
| 13 | 1.6 | 10.6 | 2.3 |
| 14 | 2.3 | 12.8 | 3.7 |
| 15 | 1.1 | 12.9 | 0.9 |
| 16 | 0 | 13.9 | 1.1 |
| 20 | −0.7 | 17.6 | 3.6 |
| 21 | 1.5 | 19 | 6.2 |
| 23 | 1.6 | 17.6 | 5.3 |
| 26 | 1.5 | 16.7 | 3.4 |
| 30 | 2.1 | 16.5 | 3.6 |
| 36 | −0.9 | — | 4.0 |

The data evidence considerable scatter; however, as depicted in FIG. 3, curves representative of the data show unmistakable trends. FIG. 3, on coordinates of wavelength change in nm and time in days at 100% relative humidity, depicts the relative moisture transmission rates for the glass substrate (curve 30), the CR-39 substrate (curve 31) and the CR-39 substrate coated with a 0.2 μm layer of polycrystalline silicon nitride (curve 32). The coated substrate is seen to be nearly as good as glass in its moisture-resistance, and considerably better than the uncoated substrate. The lower weight of the coated substrate, compared with glass of comparable thickness, enhances use of the coated substrates of the invention in such applications as helmet-mounted displays.

What is claimed is:

1. A process for fabricating a pre-holographic element supported on an optically transparent hydrophobic substrate which comprises:
   (a) forming a layer of a polycrystalline, optically transparent, moisture barrier material on at least a portion of the hydrophobic substrate by a process which generates a temperature at the substrate of less than that of its softening point at which it deforms;
   (b) forming a layer of a hydrophilic, polar material on at least a portion of the moisture barrier layer by a process which generates a temperature at the substrate less than that of its softening point; and
   (c) forming a layer of a hydrophilic, photosensitive material on at least a portion of the layer of hydrophilic, polar material.

2. The process of claim 1 in which the hydrophobic substrate includes a plastic material selected from the group consisting of cellulose-acetate, polystyrene, polyester, poly-(methyl methacrylate) and polycarbonate.

3. The process of claim 2 in which the plastic material is selected from the group consisting of poly-(methyl methacrylate) and polycarbonate.

4. The process of claim 1 in which the moisture barrier layer provides a barrier against diffusion of water vapor such that over the lifetime of the pre-holographic element, no more than about $2 \times 10^{-6}$ g $H_2O/cm^2$ is transmitted.

5. The process of claim 4 in which the moisture barrier material comprises a material selected from the group consisting of silicon nitride and silicon oxynitride.

6. The process of claim 5 in which the moisture barrier layer consists essentially of $Si_3N_4$.

7. The process of claim 1 in which the thickness of the moisture barrier layer ranges from about 0.1 to 1 $\mu$m.

8. The process of claim 1 in which the moisture barrier layer is deposited by electron beam evaporation or plasma-enhanced deposition.

9. The process of claim 1 in which the hydrophilic, polar layer comprises a material selected from the group consisting of silica, soft glasses and silicon oxynitride.

10. The process of claim 9 in which the hydrophilic layer consists essentially of $SiO_2$.

11. The process of claim 1 in which the thickness of the hydrophilic, polar layer ranges from about 0.1 to 0.5 $\mu$m.

12. The process of claim 1 in which the hydrophilic, polar layer is deposited by electron beam evaporation or plasma-enhanced deposition.

13. The process of claim 1 in which the moisture barrier layer and the hydrophilic, polar layer are co-deposited substantially simultaneously.

14. The process of claim 1 in which the moisture barrier layer and the hydrophilic, polar layer are deposited so as to form a graded layer.

15. The process of claim 1 in which the photosensitive material is gelatin-based.

16. The process of claim 15 in which the photosensitive material comprises an emulsion selected from the group consisting of dichromated gelatin, photographic silver halide emulsion and diazo gelatin.

17. Product produced by the process of claim 1.

18. A process for fabricating a hologram on the pre-holographic element of claim 1 which comprises:
   (a) exposing the photosensitive layer to an actinic interference pattern to record a latent image thereon;
   (b) developing the photosensitive layer to obtain the recorded latent image; and
   (c) forming a protective layer on at least a portion of the photosensitive layer, the protective layer including a layer of a polycrystalline, optically transparent, moisture barrier material and a layer of a hydrophilic, polar material.

19. The process of claim 15 in which the protective layer comprises an optically transparent cover material coated with a layer of the moisture barrier material and a layer of the hydrophilic, polar material, the protective layer attached to the photosensitive layer through the hydrophilic layer.

20. A process for fabricating a hologram which comprises:
   (a) forming a layer of a polycrystalline, optically transparent, moisture barrier material on at least a portion of an optically transparent hydrophobic substrate by a process which generates a temperature at the substrate of less than that of its softening point at which it deforms;
   (b) forming a layer of a hydrophilic, polar material on at least a portion of the moisture barrier layer by a process which generates a temperature at the substrate less than that of its softening point;
   (c) forming a layer of a hydrophilic, photosensitive material on at least a portion of the layer of hydrophilic, polar material;
   (d) exposing the photosensitive layer to an actinic interference pattern to record a latent image thereon;
   (e) developing the photosensitive layer to obtain the recorded latent image; and
   (f) forming a protective layer on at least a portion of the photosensitive layer, the protective layer including a layer of a polycrystalline, optically transparent, moisture barrier material and a layer of a hydrophilic, polar material.

21. The process of claim 20 in which the hydrophobic substrate includes a plastic material selected from the group consisting of cellulose-acetate, polystyrene, polyester, poly-(methyl methacrylate) and polycarbonate.

22. The process of claim 21 in which the plastic material is selected from the group consisting of poly(methyl methacrylate) and polycarbonate.

23. The process of claim 22 in which the moisture barrier material comprises a material selected from the group consisting of silicon nitride and silicon oxynitride.

24. The process of claim 23 in which the moisture barrier layer consists essentially of $Si_3N_4$.

25. The process of claim 20 in which the moisture barrier layer ranges from about 0.1 to 1 $\mu$m.

26. The process of claim 20 in which the moisture barrier layer is deposited by electron beam evaporation or plasma-enhanced deposition.

27. The process of claim 20 in which the hydrophilic, polar layer comprises a material selected from the group consisting of silica, soft glasses and silicon oxynitride.

28. The process of claim 27 in which the hydrophilic layer consists essentially of $SiO_2$.

29. The process of claim 20 in which the thickness of the hydrophilic, polar layer ranges from about 0.1 to 0.5 $\mu$m.

30. The process of claim 20 in which the hydrophilic, polar layer is deposited by electron beam evaporation or plasma-enhanced deposition.

31. The process of claim 20 in which the moisture barrier layer and the hydrophilic, polar layer are co-deposited substantially simultaneously.

32. The process of claim 20 in which the moisture barrier layer and the hydrophilic, polar layer are deposited so as to form a graded layer.

33. The process of claim 20 in which the photosensitive material is gelatin-based.

34. The process of claim 33 in which the photosensitive material comprises an emulsion selected from the group consisting of dichromated gelatin, photographic silver halide emulsion and diazo gelatin.

35. The process of claim 20 in which the protective layer comprises an optically transparent cover material coated with a layer of the moisture barrier material and a layer of the hydrophilic, polar material, the protective layer attached to the photosensitive layer through the hydrophilic layer.

36. The process of claim 20 further comprising forming a mixture of moisture barrier layers and hydrophilic, polar layers on the outer surfaces of the substrate and cover layer.

37. Product produced by the process of claim 20.

* * * * *